United States Patent [19]
Wendell

[11] Patent Number: 5,471,745
[45] Date of Patent: Dec. 5, 1995

[54] FLUID APPLICATION SYSTEM FOR NIPPERS

[76] Inventor: Robert Wendell, 1373 Mockingbird Dr., Kent, Ohio 44240

[21] Appl. No.: 391,043
[22] Filed: Feb. 21, 1995
[51] Int. Cl.⁶ .................................................. B26B 13/22
[52] U.S. Cl. .......................... 30/123.3; 30/134; 47/1.01
[58] Field of Search .................................. 30/123.3, 134; 47/1.01, 1.5

[56] References Cited

U.S. PATENT DOCUMENTS

| | | | |
|---|---|---|---|
| 144,837 | 11/1873 | Delano | 30/134 |
| 2,775,032 | 12/1956 | Sorensen | 30/134 |
| 4,783,907 | 11/1988 | Ravaux | 30/123.3 |
| 5,398,415 | 3/1995 | Collins | 30/134 |

FOREIGN PATENT DOCUMENTS

| | | | |
|---|---|---|---|
| 69421 | 11/1958 | France | 30/123.3 |

Primary Examiner—Douglas D. Watts

[57] ABSTRACT

A fluid application system for the cutting of individual flower stems. A liquid absorbent sponge is attached to the cutting blade of hand held clippers. Opposite the sponge is a compression plate mounted on the jaw of the same clippers so as to restrict the further movement of the extended sponge surface as the blade and anvil are brought together. The water filled sponge is compressed as the stem between the blade and anvil is cut, simultaneously releasing a quantity of water to the cut area and preventing the introduction of air into the flower stem's vascular system.

2 Claims, 3 Drawing Sheets

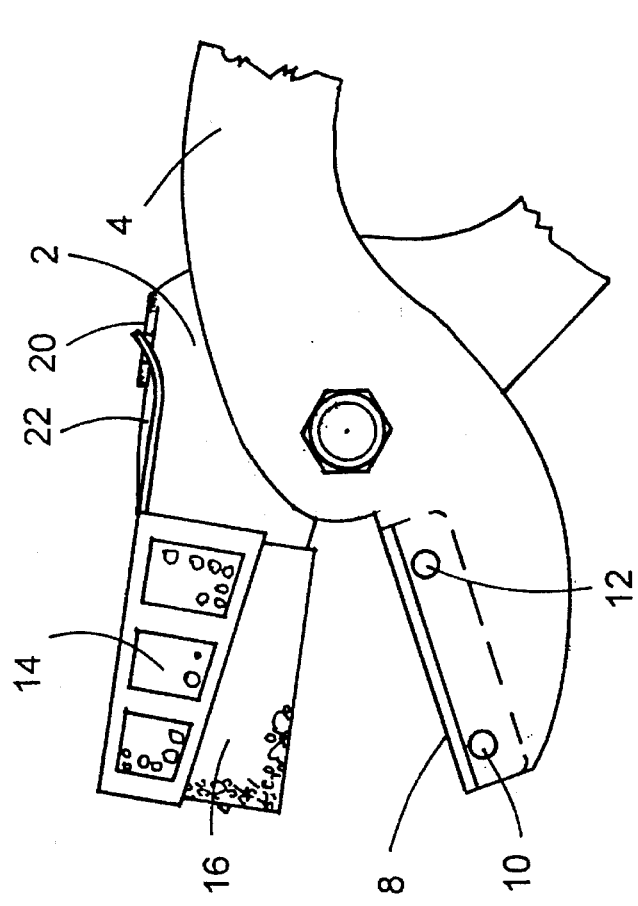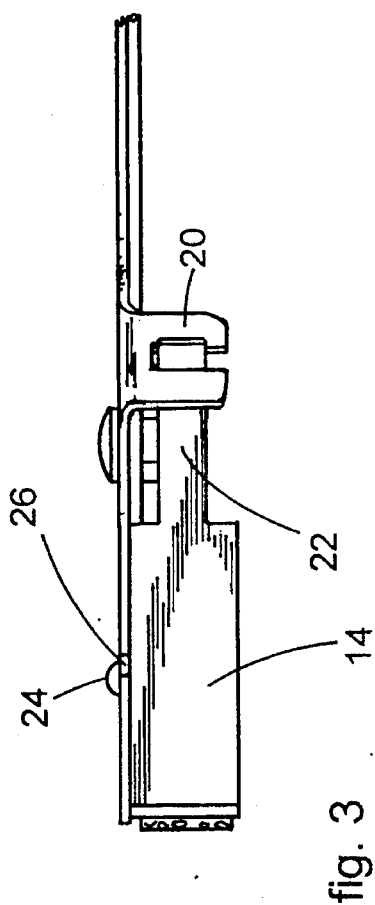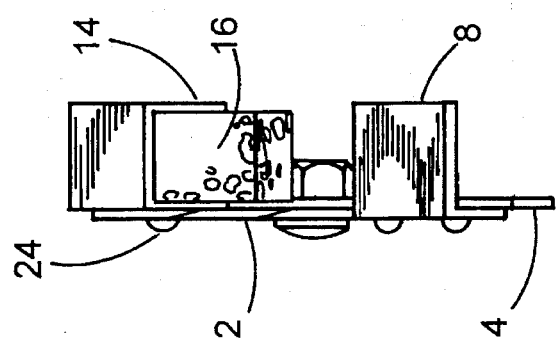
fig. 2
fig. 3
fig. 1

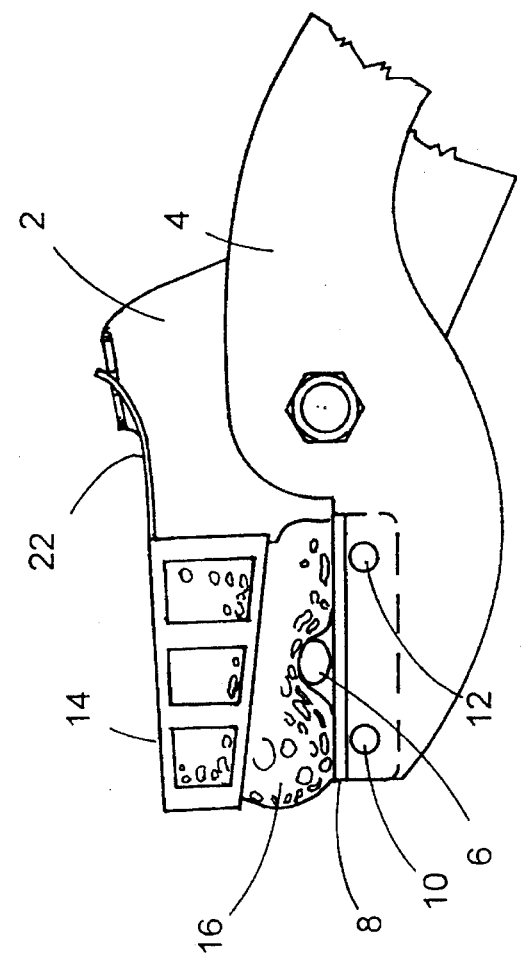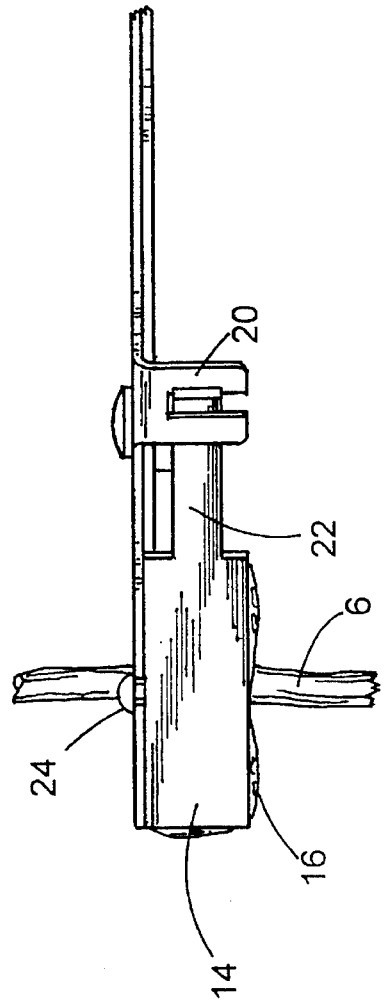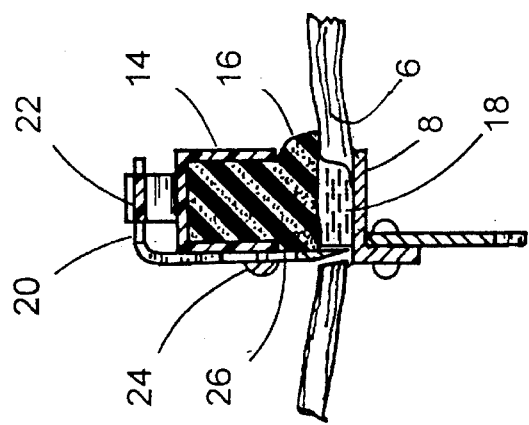

FLUID APPLICATION SYSTEM FOR NIPPERS

BACKGROUND OF THE INVENTION

This invention relates in general to simultaneously cutting and applying fluid and in particular to the application of water onto the cut portion of a single flower stem at the time of cutting.

DESCRIPTION OF THE PRIOR ART

Prolonging the fresh appearance of a cut flower is possible by maintaining the flow of water through the stem's vascular bundles, or vascular system. As water moves toward the surfaces of the flower, where it evaporates, it is replaced by water drawn upward through the tip of the stem from the container in which the flowers were placed. The vascular system can become clogged however, by air and other material entering the stem at the point of cutting. This prevents the natural flow of water through the system, resulting in wilting and loss of fresh flower appearance.

It is well known in the art that optimum cut flower life is possible when the stem is cut under water. This procedure causes a small amount of water to be retained on the stem tip, and prevents air from entering the system as it is transferred to another source of water. In practice, a small percentage of single flowers stems are ever re-cut under water. This is due primarily to inconvenient handling procedures and cumbersome equipment requirements.

Flower stems are handled individually by the grower as they are harvested, and again by the floral designer, or hobbyist, when they are prepared in an arrangement. The most common tools used by the grower and floral designer are hand held knives, shears or clippers. No simple means have existed for the grower to benefit from the effects of harvesting individual stems under water. The florist can cut stems under water by holding them in the water flowing from a faucet or while submerged in a container.

The prior art is aware of machines for cutting single flower stems under water. Examples include Hauser, U.S. Pat. No. 4,348,832, Campanelli et al., U.S. Pat. No. 4,928,424 and Brownlee et al., U.S. Pat. No. 5,174,794, In the prior art noted above, a water source in a jar, decanter or mobile flower container is required. In each instance, the amount of stem material to be removed in its utilization is limited by the depth of the container. Floral designers generally prefer to arrange flowers by selecting a stem with one hand, cut it to appropriate length with the other and then place it into an arrangement with the fewest number of movements and interruptions. Under water stem cutters can require repeated cutting to obtain the desired length, and disruptive movement away from the arrangement. These devices are also expensive to purchase, when compared with the cost of available hand tools. For these and other reasons, they are seldom used in professional floral design.

Prior art also includes hand held variations on shears and clippers for the distribution of fluid onto the cut portion of plants as they are pruned. Some examples of this prior art are briefly described below.

Simpkins, U.S. Pat. No. 2,726,484 and Drusiani, U.S. Pat. No. 5,088,198 rely on the supply of fluid from an external source and the its delivery by means of injection at the point of cutting. An external source necessarily involves a tube or hose which can restrict movement, and imposes mechanical parts and connections which are undesirable. Liquid application by injection can work well for the delivery of treatment material applied to prevent disease, but does not prevent the introduction of air at the time of cutting.

Ravaux, U.S. Pat. No. 4,783,907 and Bloom et al., U.S. Pat. No. 4,891,882 comprise hand held instruments with refillable containers integrated into their design. In these cases, a mechanism is required to control the amount of fluid being dispensed, and the containers must be removed and refilled in the course of a series of cuttings. Also common to these disclosures is the reliance on liquid delivered to the cutting edge of a blade to be transferred to the stem being cut at the time of cutting. This methodology may provide a sufficient amount of substance to effectively meet the primary objective of introducing treatment material into the stem cutting in order to prevent disease, but it does not provide for the complete submersion of the area to be cut or prevent air from entering the stem at the time of cutting. This deficiency, together with their mechanical bulk, complexity and relatively high cost to manufacture and maintain, prevent these tools from being desirable alternatives.

Professional and amateur floral designers require the speed and versatility of unattached hand held tools with which they are familiar. It is also important that these tools are inexpensive and easy to maintain. Grower harvesters also require inexpensive hand held tools with which they are familiar, and the ability to move unencumbered throughout a greenhouse.

SUMMARY OF THE INVENTION

It is a principal objective of the present invention to achieve the benefits of cutting a stem under water without requiring the stem to be held under water. It is also a principal object of this invention to provide a relatively inexpensive device that can be operated in a way now familiar to the user, and is easy to maintain.

These goals are met in the present invention through a dispensing system which provides the direct application of water to the stem at the time of cutting without the use of an external supply or a container which must be replaced when emptied. The device utilizes the cutting movement of the assembled tool to release water at the point of stem cutting, in a manner that simulates an under water condition. The self contained water reservoir is easily refilled without removal from the tool and allows the user to make a series of cuts before refilling is required. The reservoir is replenished by periodically submerging the entire tool into a liquid container located near the work area.

The mechanical and material aspects of the invention consist of uniquely configured hand-held clippers of the cutting blade and anvil type in combination with a water dispensing system.

One part of the dispensing system consists of a water reservoir made of liquid absorbent sponge material fixed in a spring mounted retainer, attached to the side of the cutting blade. The open side of the retainer and projected sponge material are opposite the lower jaw. Attachment is made with a surface of the sponge projecting from the retainer and extended beyond the edge of the cutting blade.

The second part of the system is comprised of an extended anvil plate, attached to the side of the lower jaw opposite the liquid absorbent sponge with its surface generally perpendicular to the edge of the cutting blade.

The device is held with the water reservoir above the extended anvil plate, and is dipped into a liquid solution until the liquid absorbent sponge material is saturated. The liquid solution may also contain floral preservative or other materials designed to prolong the marketable life of the cut flower. Specialty solutions may also be used in other pruning and cutting applications in order to prevent plant infection.

The method of the invention is contained in the cutting motion as the cutting blade and extended anvil plate are brought together. This movement causes the projected portion of the sponge to be compressed against the stem and the extended anvil plate surface at the point where the cutting blade is in contact with the stem. Because stems may be of varying diameter, the compression of the sponge is regulated by the flexibility of the leaf spring extension, allowing the sponge and retainer to adjust to varying diameters within the range of the stud retention slot during the cutting process. On further compression, liquid solution is released from the sponge material at the point where the cutting blade, stem and extended anvil plate meet. Gravity causes the water to flow down onto the cutting blade and stem, where it is available to enter the cut as the blade penetrates the stem. The simultaneous cutting and coating action causes water to be retained on the stem tip, preventing air from entering the stem system as it is moved from the point of cutting to its next source of water. This result is the same observed when cutting the stem under water. The next supply of water for the cut stem can be a grower's container after harvest, or that provided by the end user for an arrangement. Now able to draw water through its vascular system, the cut flower's fresh appearance is prolonged.

BRIEF DESCRIPTION OF THE DRAWINGS

FIG. 1 is a front elevation illustrating the invention with cutting blade and lower jaw open;

FIG. 2 is a left-side elevation thereof;

FIG. 3 is a top view thereof;

FIG. 4 is a section A—A illustrating the invention with cutting blade and lower jaw in the closed position;

FIG. 5 is a left-side elevation thereof;

FIG. 6 is a top view thereof; and

DETAILED DESCRIPTION OF THE DRAWINGS

Figure 7:
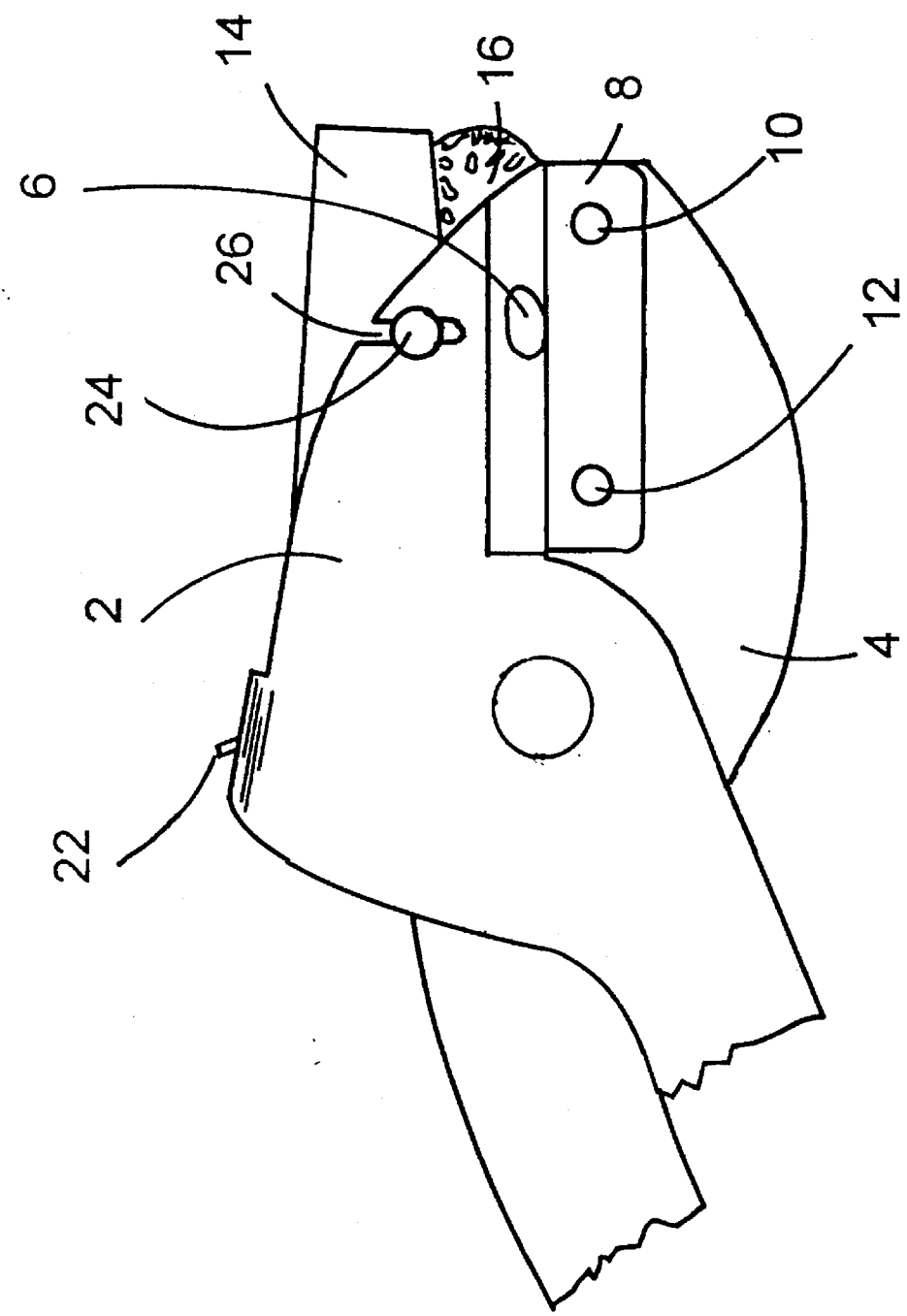
FIG. 7 is a right-side elevation thereof.

FIGS. 1, 2, 3, 4, 5 and 6 show the assembled device to include hand held clippers having mounting points located on the cutting blade 2 and lower jaw 4 upon which the stem 6 is placed in preparation for cutting. An extended anvil plate 8 is connected to points 10 and 12 on the lower jaw 4. To the cutting blade 2 is attached a retainer 14 in which liquid absorbent sponge material 16 is partially contained.

FIG. 4 in particular shows the cutting blade 2 and lower jaw 4 in a closed position wherein the liquid absorbent sponge material 16 has been compressed, thereby releasing liquid 18 which completely surrounds the retainable portion of the stem 6 immediately preceding the entry of the cutting blade 2 and entering the cut as the stem 6 is severed and the cutting blade 2 makes contact with the extended anvil plate 8.

The retainer 14 can be seen attached at one point to the cutting blade 2 by means of its leaf spring extension 22 passed through a slot provided in the spring retention tab 20. FIG. 7 shows the retainer 14 is attached at another point to the cutting blade 2 by means of a stud connector 24 contained in a retention slot 26 which allows vertical movement and provides lateral containment.

Although the retainer 14 is shown as made of plastic, other materials may be substituted which perform essentially the same function.

I claim:

1. Nippers in combination with a fluid application system comprising:

a cutting blade and handle;

a lower jaw and handle, pivotally attached to said cutting blade;

a retainer, including a stud connector having a shaft portion and a head portion on one side thereof and a leaf spring extension at the rear thereof;

a liquid absorbent sponge positioned within said retainer thereby securing its placement;

a channel in said cutting blade to receive the shaft of said stud connector of said retainer;

a leaf spring retention tab having a slot situated on the rear part of said cutting blade for the containment of said leaf spring extension of said retainer, the slot of said tab having forward and rear edges wherein the forward edge functions as a fulcrum for resistance between the extension of said leaf spring at the rear edge of the slot and said stud connector at the limiting end of the said channel, thereby containing said retainer and said liquid absorbent sponge in position next to the surface of said cutting blade;

an anvil plate attached to said lower jaw and extending generally perpendicular to the plane in which the said pivotally attached cutting blade and jaw move, said anvil plate restricting movement of said liquid absorbent sponge as said cutting blade and said lower jaw are brought together, thereby causing temporary greater distortion in shape of the said leaf spring extension and subsequent compression of the said liquid absorbent sponge, resulting in the release of liquid simultaneous with the cutting motion of said pivotally attached cutting blade and lower jaw, whereby stems or other plant material are saturated with liquid thereby preventing air from entering the plants vascular system at the time they are cut.

2. The invention of claim 1 wherein said retainer is secured to said cutting blade in a fixed position.

* * * * *